United States Patent
Kwon et al.

(10) Patent No.: US 8,797,979 B2
(45) Date of Patent: Aug. 5, 2014

(54) METHOD AND APPARATUS FOR TRANSMITTING UPLINK CONTROL SIGNAL IN WIRELESS COMMUNICATION SYSTEM

(75) Inventors: Yeong Hyeon Kwon, Anyang-si (KR); So Yeon Kim, Anyang-si (KR); Han Gyu Cho, Anyang-si (KR); Jae Hoon Chung, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 254 days.

(21) Appl. No.: 13/265,993

(22) PCT Filed: Apr. 20, 2010

(86) PCT No.: PCT/KR2010/002437
§ 371 (c)(1),
(2), (4) Date: Oct. 24, 2011

(87) PCT Pub. No.: WO2010/126247
PCT Pub. Date: Nov. 4, 2010

(65) Prior Publication Data
US 2012/0044896 A1 Feb. 23, 2012

Related U.S. Application Data
(60) Provisional application No. 61/172,779, filed on Apr. 26, 2009.

(30) Foreign Application Priority Data
Apr. 15, 2010 (KR) ........................ 10-2010-0034829

(51) Int. Cl.
*H04W 4/00* (2009.01)
*H04W 72/00* (2009.01)

(52) U.S. Cl.
USPC ........................................... 370/329; 455/450

(58) Field of Classification Search
CPC ..... H04L 1/1607; H04L 1/854; H04L 1/1861; H04L 5/0055; H04W 72/04; H04W 16/10
USPC ............ 370/329, 330, 341, 374.41, 441, 442, 370/436, 476; 455/450–452.2
See application file for complete search history.

(56) References Cited

U.S. PATENT DOCUMENTS

| | | | |
|---|---|---|---|
| 8,428,011 B2 * | 4/2013 | Inoue et al. | 370/329 |
| 2008/0170634 A1 | 7/2008 | Kwak et al. | |
| 2009/0055703 A1 | 2/2009 | Kim et al. | |
| 2009/0109908 A1 * | 4/2009 | Bertrand et al. | 370/329 |
| 2009/0207725 A1 * | 8/2009 | Zhang | 370/203 |
| 2012/0002568 A1 * | 1/2012 | Tiirola et al. | 370/252 |
| 2012/0063400 A1 * | 3/2012 | Papasakellariou et al. | 370/329 |

FOREIGN PATENT DOCUMENTS

| | | |
|---|---|---|
| KR | 1020080073616 | 8/2008 |
| WO | 2007/148710 | 12/2007 |
| WO | 2008/039034 | 4/2008 |

* cited by examiner

*Primary Examiner* — Habte Mered
(74) *Attorney, Agent, or Firm* — Lee, Hong, Degerman, Kang & Waimey

(57) ABSTRACT

The present invention relates to a method for a terminal for transmitting an uplink control signal, i.e., an ACK/NACK (Acknowledgement/Negative-ACK) signal, in a wireless communication system. In particular, the method comprises: mapping part of the ACK/NACK signals to selection information, which is composed of a combination of message areas and reference signal areas; independently selecting one message area and one reference signal from a plurality of control channel resources that are located in the same resource block, based on the mapped selection information; allocating the selected message area to the other ACK/NACK signals; and transmitting the ACK/NACK signal to a base station by using the selected message area and the selected reference signal area.

10 Claims, 12 Drawing Sheets

Single Component Carrier (e.g., LTE System)

PUCCH format 1a and 1b structures (Normal CP)

METHOD AND APPARATUS FOR TRANSMITTING UPLINK CONTROL SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2010/002437, filed on Apr. 20, 2010, which claims the benefit of earlier filing date and right of priority to Korean Application No. 10-2010-0034829, filed on Apr. 15, 2010, and also claims the benefit of U.S. provisional application 61/172,779, filed on Apr. 26, 2009, the contents of which are hereby incorporated by reference herein in their entirety.

TECHNICAL FIELD

The present invention relates to a wireless communication system. And, more particularly, the present invention relates to a method for transmitting uplink control signal in a wireless communication system, wherein a carrier aggregation scheme is applied, and an apparatus thereof.

BACKGROUND ART

As an example of a wireless communication system to which the present invention may be applied, a 3GPP LTE ($3^{rd}$ Generation Partnership Project Long Term Evolution; hereinafter referred to as "LTE") communication system will now be broadly described.

FIG. 1 illustrates a general view of an E-UMTS network structure as an example of a wireless communication system. Herein, the E-UMTS (Evolved Universal Mobile Telecommunications System) corresponds to a system evolved from the conventional UMTS (Universal Mobile Telecommunications System). The 3GPP is presently carrying out a basic standardization process for the E-UMTS. Generally, the E-UMTS may also be referred to as an LTE system. For details of the technical specifications of the UMTS and the E-UMTS, reference may be made to Release 7 and Release 8 of "3rd Generation Partnership Project; Technical Specification Group Radio Access Network".

Referring to FIG. 1, the E-UMTS includes a User Equipment (UE) (120), base stations (eNode B; eNB) 110a and 110b, and an Access Gateway (AG), which is located at an end of a network (E-UTRAN) and connected to an external network. The base stations can simultaneously transmit multiple data streams for a broadcast service, a multicast service and/or a unicast service.

One or more cells may exist for one base station. One cell is set to one of bandwidths of 1.25, 2.5, 5, 10, and 20 MHz to provide a downlink or uplink transport service to several user equipments. Different cells may be set to provide different bandwidths. Also, one base station controls data transmission and reception for a plurality of user equipments. The base station transmits Downlink (DL) scheduling information of downlink data to the corresponding user equipment to notify information related to time and frequency domains to which data will be transmitted, encoding, data size, and HARQ (Hybrid Automatic Repeat and reQuest). Also, the base station transmits Uplink (UL) scheduling information of uplink data to the corresponding user equipment to notify information related to time and frequency domains that can be used by the corresponding user equipment, encoding, data size, and HARQ. An interface for transmitting user traffic or control traffic can be used between the base stations. A Core Network (CN) may include the AG and a network node or the like for user registration of the UE. The AG manages mobility of a UE on a TA (Tracking Area) unit basis, wherein one TA unit includes a plurality of cells.

The wireless communication technology has been developed up to the LTE based upon WCDMA. However, the demands and expectations of the users and the manufacturers and providers are growing continuously. Also, since other wireless access technologies are constantly being developed, the wireless communication technology is required to newly evolve in order to ensure competiveness in the future. Accordingly, characteristics, such as reduced cost for each bit, extended service availability, usage of a flexible frequency band, simple structure and open interface, and adequate power consumption of the user equipment are being requested.

Recently, a standardization procedure for a succeeding (or subsequent) technology of the LTE has been under progress by the 3GPP. In the description of the present invention, the above-mentioned technology will be referred to as "LTE-Advanced" or "LTE-A". The essential difference between the LTE system and the LTE-A system is the system bandwidth. The LTE-A system aims to support a broadband of up to 100 MHz. For this, the LTE-A system encourages the use of a carrier aggregation (or bandwidth aggregation) technology, which achieves a broadband by using multiple component carriers. In order to use a wider (or broader) frequency band, the carrier aggregation (or bandwidth aggregation) uses a plurality of component carriers as a single large logical frequency band. The bandwidth of each component carrier (or bandwidth carrier) may be defined based upon the bandwidth of a system block used in the LTE system. Each component carrier (or bandwidth carrier) uses a component carrier (or bandwidth carrier) so as to be transmitted.

DETAILED DESCRIPTION OF THE INVENTION

Technical Objects

An object of the present invention is to provide a method for transmitting an uplink control signal in a wireless communication system, which applies a carrier aggregation scheme, and an apparatus thereof.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In an aspect of the present invention, as a method of a user equipment for transmitting an ACK/NACK (Acknowledgement/Negative-ACK) signal in a wireless communication system, the method for transmitting an ACK/NACK signal includes the steps of mapping some of multiple ACK/NACK signals to reference signal area selection information; based upon the mapped reference signal area selection information, selecting one or more reference signal areas among multiple control channel resources, the multiple control channel resources being located in a same physical resource block; allocating a message area of each of the multiple control channel resources to remaining ACK/NACK signals; and transmitting ACK/NACK signals to a base station by using the one or more selected reference signal areas and the message area of each of the multiple control channel resources. Herein, it is preferable that the reference signal area selection information corresponds to information related to a combination of one or more reference signal areas, among reference signal areas included in the multiple control channel resources.

Also, when a number of reference signal areas included in the multiple control channel resources is equal to N, and when a number of the selected reference signal areas is equal to K, a size of some of the ACK/NACK signals may correspond to a number of bits smaller than $\log_2\{_NC_K\}$ bits or $\log_2\{_NC_K\}$ bits, wherein the number of bits is an integer.

In another aspect of the present invention, as a method for allocating resources enabling a user equipment to transmit an ACK/NACK (Acknowledgement/Negative-ACK) signal in a wireless communication system, the method for transmitting an ACK/NACK signal includes the steps of mapping some of multiple ACK/NACK signals to selection information, the selection information being configured of a combination of a message area and a reference signal area; based upon the mapped selection information, independently selecting one message area and one reference signal area among multiple control channel resources, the multiple control channel resources being located in a same physical resource block; allocating the selected message area to remaining ACK/NACK signals; and transmitting ACK/NACK signals to a base station by using the selected message area and the selected reference signal area. Herein, when a number of the multiple control channel resources is equal to N, a size of some of the ACK/NACK signals may correspond to a number of bits smaller than $\log_2(N*N)$ bits or $\log_2\{N*N\}$ bits, wherein the number of bits is an integer.

Preferably, the method may further include the step of receiving information on multiple control channel resources from the base station, the multiple control channel resources being located in a same physical resource block. And, each of the selected message area and the selected reference signal area may be included in a different control channel resource.

In yet another aspect of the present invention, a user equipment includes a processor configured to map some of multiple ACK/NACK signals to reference signal area selection information, to select one or more reference signal areas among multiple control channel resources, based upon the mapped reference signal area selection information, the multiple control channel resources being located in a same physical resource block, and to allocate a message area of each of the multiple control channel resources to remaining ACK/NACK signals; and a transmission module configured to transmit ACK/NACK signals to a base station by using the one or more selected reference signal areas and the message area of each of the multiple control channel resources. Herein, the reference signal area selection information may correspond to information related to a combination of one or more reference signal areas, among reference signal areas included in the multiple control channel resources.

Also, when a number of reference signal areas included in the multiple control channel resources is equal to N, and when a number of the selected reference signal areas is equal to K, a size of some of the ACK/NACK signals may correspond to a number of bits smaller than $\log_2\{_NC_K\}$ bits or $\log_2\{_NC_K\}$ bits, wherein the number of bits is an integer.

Meanwhile, in a further aspect of the present invention, a user equipment includes a processor configured to map some of multiple ACK/NACK signals to selection information, the selection information being configured of a combination of a message area and a reference signal area, to independently select one message area and one reference signal area among multiple control channel resources, based upon the mapped selection information, the multiple control channel resources being located in a same physical resource block, and to allocate the selected message area to remaining ACK/NACK signals; and a transmission module configured to transmit ACK/NACK signals to a base station by using the selected message area and the selected reference signal area. Herein, when a number of the multiple control channel resources is equal to N, a size of some of the ACK/NACK signals may correspond to a number of bits smaller than $\log_2(N*N)$ bits or $\log_2\{N*N\}$ bits, wherein the number of bits is an integer.

Preferably, information on multiple control channel resources may be signaled from the base station, the multiple control channel resources being located in a same physical resource block. And, each of the selected message area and the selected reference signal area may be included in a different control channel resource.

Effects of the Invention

According to the exemplary embodiments of the present invention, in a wireless communication system applying a carrier aggregation scheme, a user equipment may effectively transmit an uplink control signal to a base station.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BRIEF DESCRIPTION OF THE DRAWINGS

The accompanying drawings, which are included to provide a further understanding of the invention and are incorporated in and constitute a part of this application, illustrate embodiments of the invention and along with the description serve to explain the spirit and scope (or principle) of the invention.

BEST MODE FOR CARRYING OUT THE PRESENT INVENTION

Hereinafter, the structure, operation, and other characteristics according to the preferred embodiments of the present invention will now be described in detail with reference to the accompanying drawings and the details given in the accompanying drawings. Hereinafter, the preferred embodiments of the present invention correspond to examples wherein the technical characteristics of the present invention are applied in a 3GPP system.

Hereinafter, a system, wherein the system band uses a single component carrier, will be referred to as a legacy system or a narrowband system. Respectively, a system, wherein the system band includes multiple component carriers, and wherein at least one or more component carriers are used as a system block of a legacy system, will be referred to as an evolved system or a wideband system. A component carrier used as a legacy system block has the same size as that of a system block of legacy system. Conversely, the sizes of the remaining components carriers are not particularly limited. However, in order to simplify the system, the sizes of the remaining component carriers may also be decided based upon the system block size of the legacy system. For example, the relation between a 3GPP LTE system and a 3GPP LTE-A system corresponds to a relation between a legacy system and an evolved system.

Based upon the above-described definition, the 3GPP LTE system will be referred to as an LTE system or a legacy system in the description. Also, a user equipment supporting the LTE system will be referred to as an LTE user equipment (or terminal) or a legacy user equipment (or terminal). Respectively, the 3GPP LTE-A system will be referred to as an LTE-A system or an evolved system in the description. Also, a user equipment supporting the LTE-A system will be referred to as an LTE-A user equipment (or terminal) or an evolved user equipment (or terminal).

In the description of the present invention, the LTE system and the LTE-A system are used to describe the embodiments of the present invention, for simplicity. However, this is merely exemplary, and the embodiments of the present invention may be applied to any communication system corresponding to the above definition.

Figure 1:
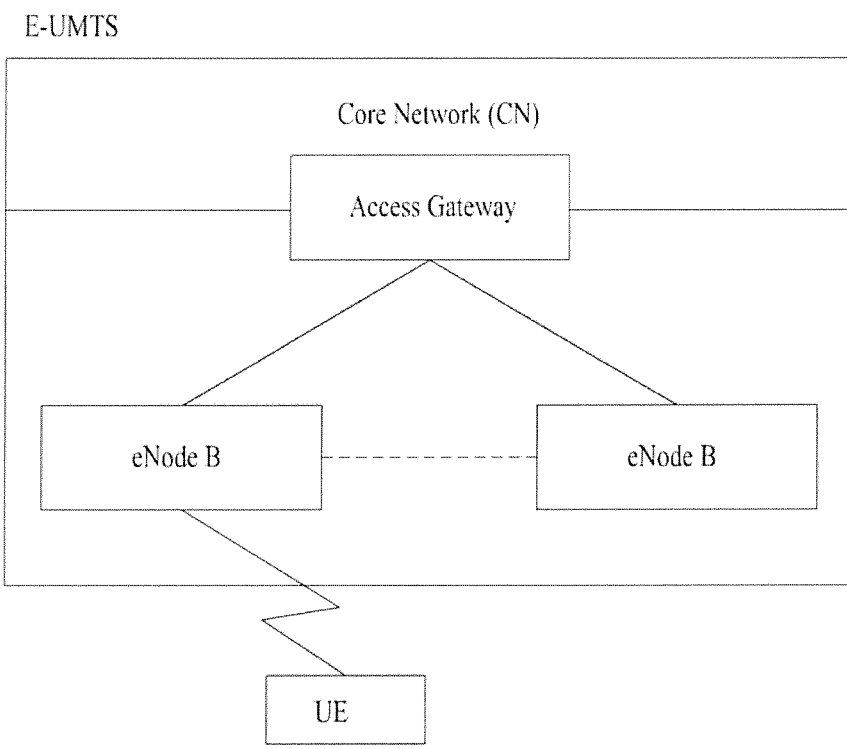
FIG. 1 illustrates a general view of an E-UMTS network structure as an example of a wireless communication system.
Figure 2:
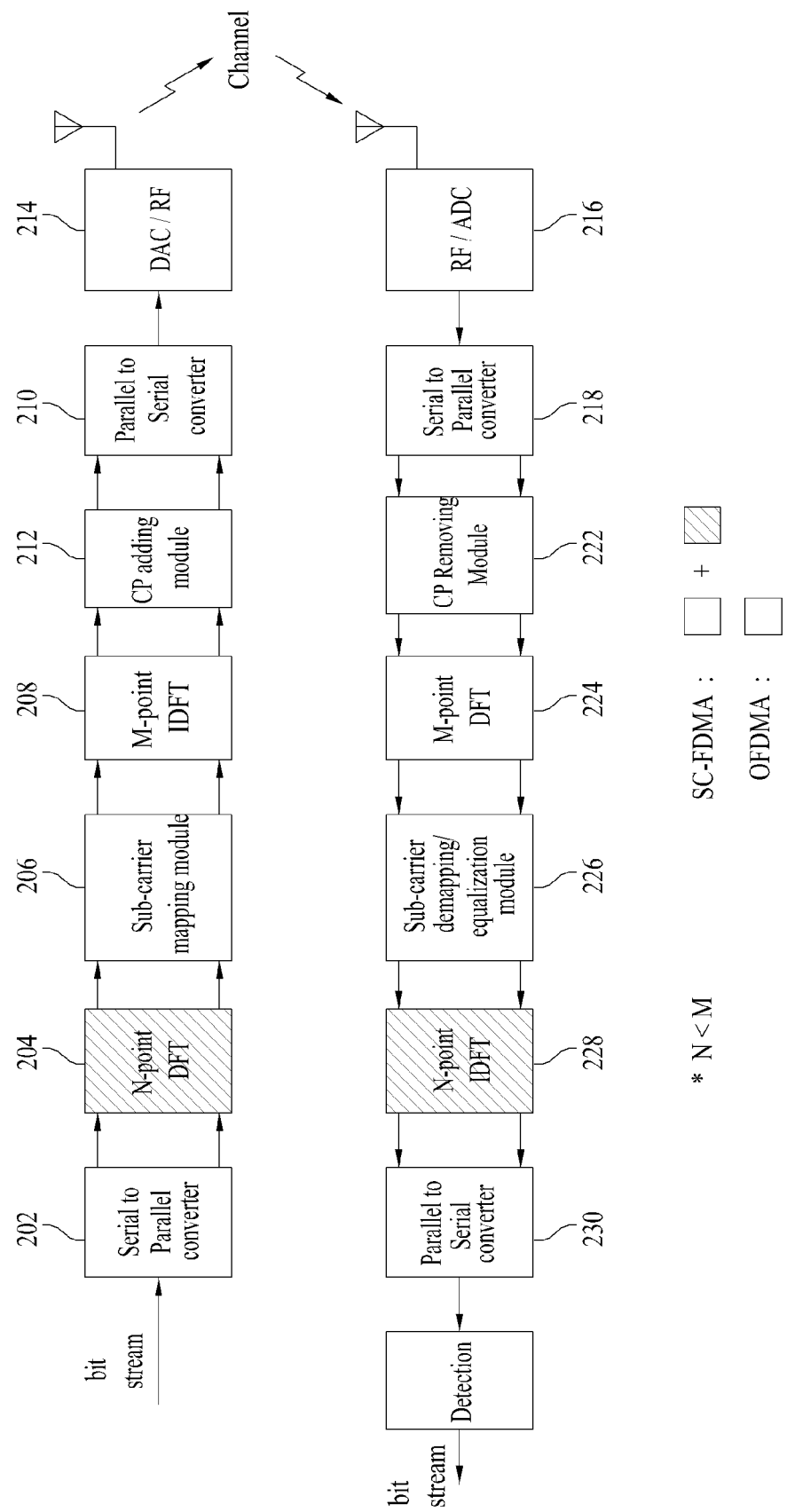
FIG. 2 illustrates block views of a transmitter and a receiver for OFDMA and SC-FDMA.

FIG. 2 illustrates block views of a transmitter and a receiver for OFDMA and SC-FDMA. In an uplink, a transmitter (202~214) is a user terminal, and a receiver (216~230) is a portion of a base station. In a downlink, the transmitter is a portion of the base station, and the receiver is a portion of the user terminal.

Referring to FIG. 2, an OFDMA transmitter includes a Serial to Parallel converter (202), a sub-carrier mapping module (206), an M-point IDFT (Inverse Discrete Fourier Transform module (208), a Cyclic prefix (CP) adding module (210), a Parallel to Serial converter (212), and an RF (Radio Frequency)/DAC (Digital to Analog Converter) module (214).

In the OFDMA transmitter, a signal processing procedure is as described below. Firstly, a bit stream is modulated to a data symbol sequence. The bit stream may be obtained by performing diverse signal processing, such as channel encoding, interleaving, scrambling, and so on, on a data block received (or delivered) from a Medium Access Control (MAC) layer. The bit stream may also be referred to as a codeword and is equivalent to a data block received from the MAC layer. The data block received from the MAC layer may also be referred to as a transmission block. Although the modulation method of the present invention will not be limited to the following examples, the modulation method may include BPSK (Binary Phase Shift Keying), QPSK (Quadrature Phase Shift Keying), and n-QAM (Quadrature Amplitude Modulation). Subsequently, a serial data symbol sequence is converted in parallel by N number of units (202). N number of data symbols is mapped to N number of sub-carriers, which is assigned from a total of M number of sub-carriers. Then, the remaining M-N number of sub-carriers is padded to 0 (206). The data symbols mapped to a frequency domain are converted to a time domain sequence via M-point IDTF processing (208). Thereafter, in order to reduce Inter-Symbol Interference (ISI) and Inter-Carrier Interference (ICI), a CP is added to the time domain sequence, thereby generating an OFDMA symbol (210). The generated OFDMA symbol is converted from parallel to serial (212). Afterwards, the OFDMA symbol is processed with procedures such as digital-to-analog conversion, frequency uplink conversion, so as to be transmitted (or delivered) to the receiver (214). Another user is assigned with available sub-carriers among the remaining M-N number of sub-carriers. An OFDMA receiver includes an RF/ADC (Analog to Digital Converter) module (216), a Serial to Parallel converter (218), a Remove CP module (220), an M-point DFT (Discrete Fourier Transform) module (222), a sub-carrier demapping/equalization module (224), a Parallel to Serial converter (228), and a detection module (230). The signal processing procedure of the OFDMA receiver is configured as an inverse procedure of the OFDMA transmitter.

In comparison with the OFDMA transmitter, an SC-FDMA transmitter additionally includes an N-point DFT module (204) before the sub-carrier mapping module (206). Prior to IDTF processing, the SC-FDMA transmitter disperses multiple data to the frequency domain through DFT, thereby being capable of reducing a PAPR (Peak-to-Average Power Ratio) of the transmitting signal, as compared to the PFDMA method. In comparison with the OFDMA receiver, an SC-FDMA receiver additionally includes an N-point IDFT module (226) after the sub-carrier demapping/equalization module (224). The signal processing procedure of the SC-FDMA receiver is configured as an inverse procedure of the SC-FDMA transmitter.

Figure 3:
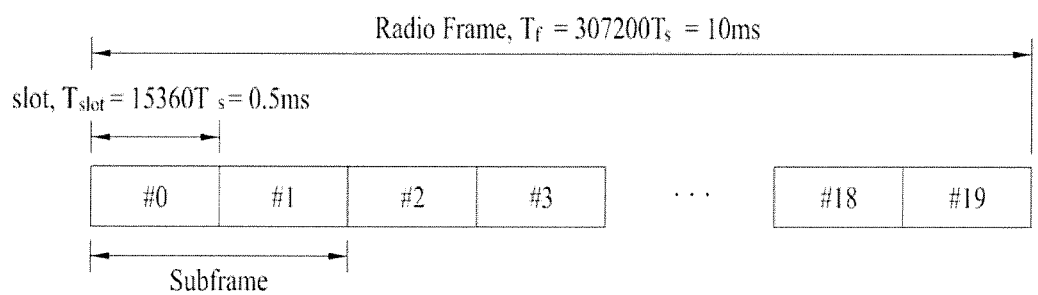
FIG. 3 illustrates an exemplary structure of a wireless frame used in the LTE.

FIG. 3 illustrates an exemplary structure of a wireless frame used in the LTE.

Referring to FIG. 3, a radio frame has the length of 10 ms ($327200 \cdot T_s$) and is configured of 10 subframes each having the same size. Each subframe has the length of 1 ms and is configured of 2 slots. Each slot has the length of 0.5 ms ($15360 \cdot T_s$). Herein, $T_s$ represents a sampling time and is indicated as $T_s=1/(15 \text{ kHz} \times 2048)=3.2552 \times 10^{-8}$ (approximately 33 ns). A slot includes multiple OFDMA (or SC-FDMA) symbols in the time domain and includes multiple Resource Blocks (RBs) in the frequency domain. In the LTE system, one resource block includes 12 subcarriers×7(6) OFDMA (or SC-FDMA) symbols. A Transmission Time Interval (TTI), which corresponds to a time unit at which the data are transmitted, may be decided as one or more subframe units. The above-described structure of the radio frame is merely exemplary. And, therefore, the number of subframes within a radio frame, the number of slots within a subframe, and the number of OFDMA (or SC-FDMA) symbols within a slot may be diversely modified.

Figure 4:
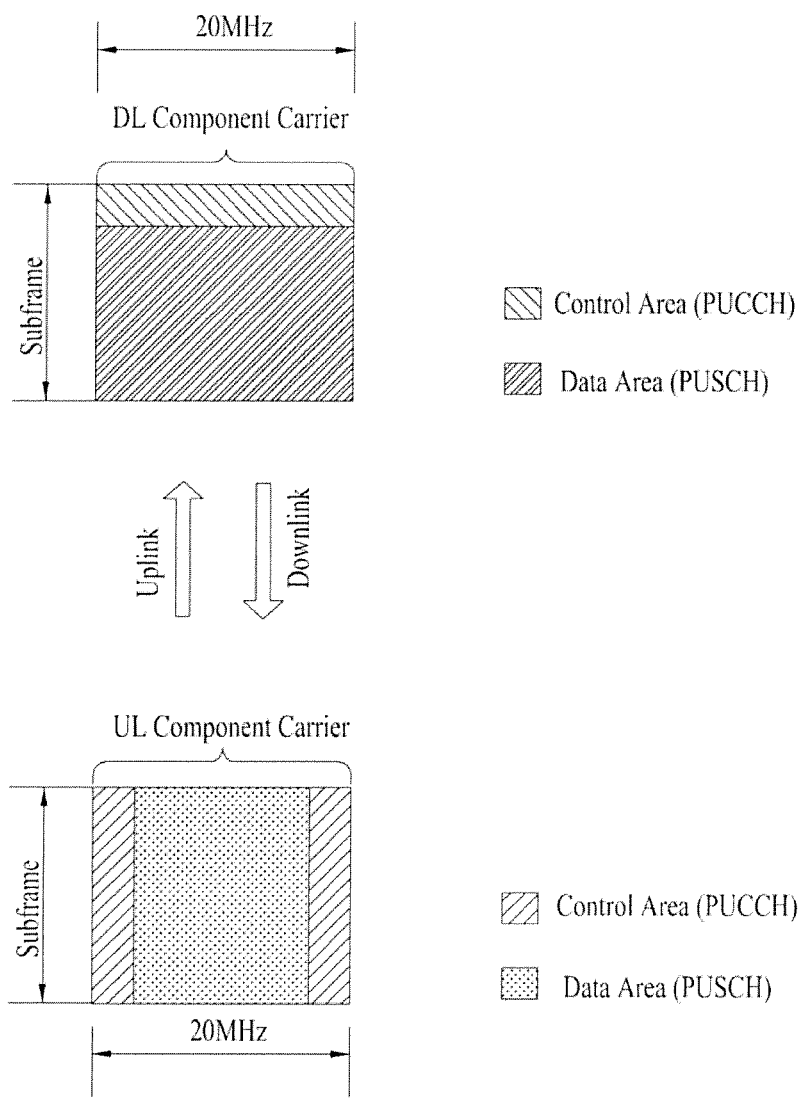
FIG. 4 illustrates an example of performing communication in a single component carrier condition.

FIG. 4 illustrates an example of performing communication in a single component carrier condition. FIG. 4 may correspond to a communication example of the LTE system. In an FDD (Frequency Division Duplex) method, data transmission and reception may be performed via one downlink band and one uplink band respective to the downlink band. More specifically, in the FDD method, the radio frame structure of FIG. 4 is used only in a downlink transmission or an uplink transmission. Conversely, in a TDD (Time Division Duplex) method, the same frequency band is divided into a downlink section and an uplink section respective to the downlink section. More specifically, in the TDD method also, the radio frame structure of FIG. 4 is used only in a downlink transmission or an uplink transmission.

Referring to FIG. 4, a method of performing an HARQ (Hybrid Automatic Repeat and reQuest) procedure by the user equipment (or terminal) will be described in detail. In the LTE system, a control information on a downlink data transmission of the base station (e.g., a scheduling information) is transmitted (or delivered) through a downlink control channel predetermined in a control region of the downlink subframe. The downlink control channel includes a PDCCH (Physical Downlink Control Channel). The user equipment first receives the scheduling information (e.g., resources assigned with data, the size of the data, the coding method, the redundancy version, etc.) through the control channel and may, then, receive scheduled data through a downlink shared channel, which is indicated (or designated) by the scheduling information. The downlink shared channel includes a PDSCH (Physical Uplink Channel). Subsequently, the user equipment may transmit a reception response signal (e.g., HARQ ACK/NACK) for the downlink data through an uplink control channel predetermined within the control region of the uplink subframe. The uplink control channel includes a PUCCH (Physical Uplink Control Channel). In the description of the present invention, the HARQ ACK/NACK will be simply indicated as ACK/NACK signal for simplicity. The base station receives the ACK/NACK signal from the user equipment. Then, the base station performs retransmission of the downlink data designated as NACK. When the base station transmits multiple downlink data to the user equipment, the HARQ procedure may be performed for each transmission block respective to each downlink data.

Figure 5:
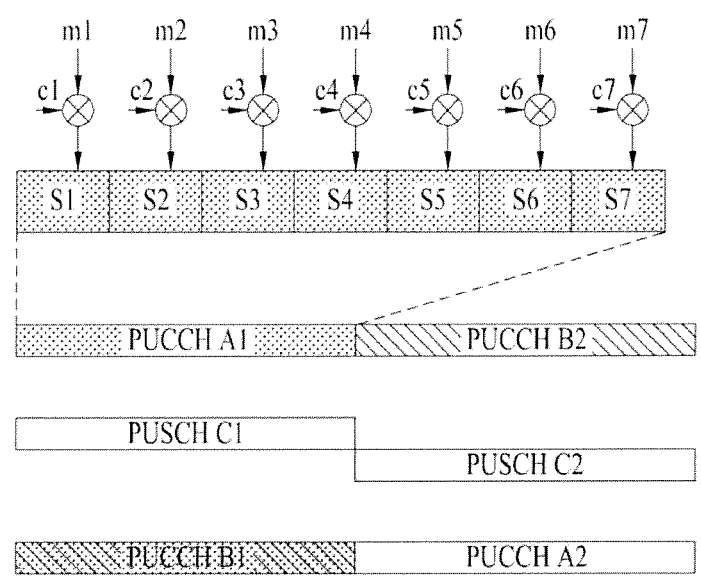
FIG. 5 illustrates an exemplary uplink sub-frame used in the LTE.

FIG. 5 illustrates an exemplary uplink sub-frame used in the LTE.

Referring to FIG. 5, the uplink subframe includes a plurality (e.g., 2) slots. Depending upon the CP length, each slot may include a different number of SC-FDMA symbols. For example, in case of a normal CP, a slot may include 7 SC-FDMA symbols. The uplink subframe is divided into a data region and a control region. The data region includes the PUSCH and is used for transmitting data signals, such as audio signals. The control region includes the PUCCH and is used for transmitting control information. The PUCCH includes an RB pair (e.g., m=0, 1, 2, 3) positioned at each end of the data region along a frequency axis. And, the PUCCH performs hopping at slot boundaries. The control information includes ACK/NACK, CQI, PMI, RI, and so on. Furthermore, the PUSCH and the PUCCH are not transmitted simultaneously. Table 1 below specifies the characteristics of a PUCCH format described in 3GPP TS 36.211 Release-8.

TABLE 1

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

Figure 6:
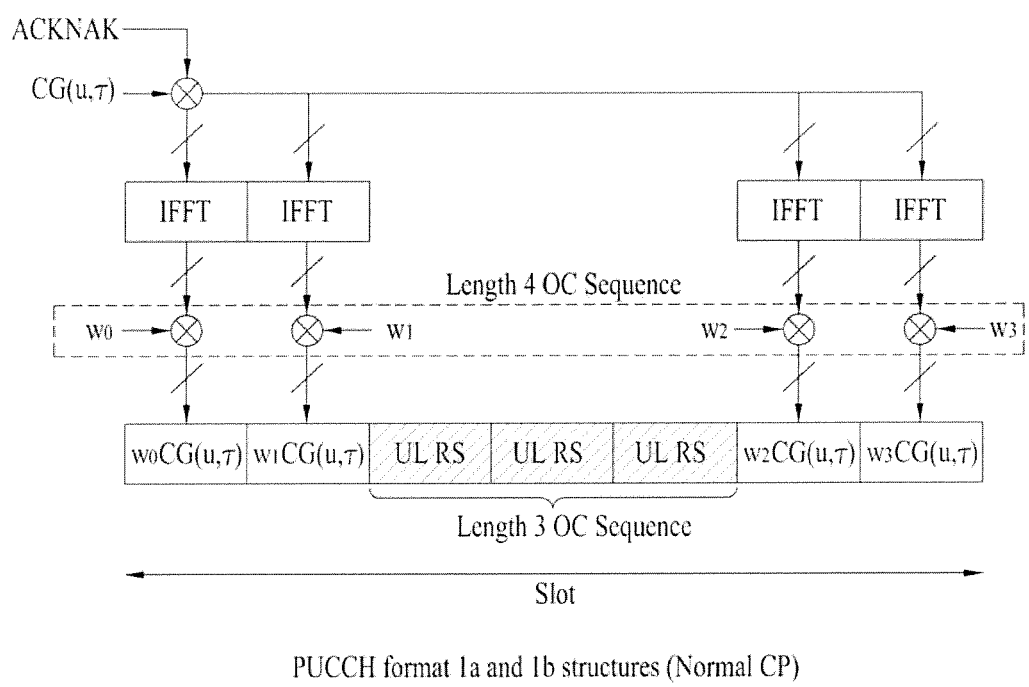
FIG. 6 illustrates an exemplary PUCCH structure for transmitting ACK/NACK.

FIG. 6 illustrates an exemplary PUCCH structure for transmitting ACK/NACK.

Referring to FIG. 6, in case of a normal CP, a reference signal (UL RS) is carried (or contained) in 3 contiguous (or consecutive) symbols positioned in the middle of the slot, and control information (i.e., ACK/NACK) is carried (or contained) in the remaining 4 symbols. In case of an extended CP, a slot includes 6 symbols, among which the $3^{rd}$ and $4^{th}$ symbols are carried (or contained) in the reference signal. The ACK/NACK received from multiple user equipments are multiplexed in one PUCCH resource by using a CDM method. The CDM method is realized by using a Cyclic Shift (CS) of a sequence for frequency distribution (or dispersion) and/or an orthogonal dispersion code for time dispersion. For example, the ACK/NACK is differentiated by using different Cyclic Shifts (CSs) of a CG-CAZAC (Computer Generated Constant Amplitude Zero Auto Correlation) sequence (frequency dispersion) and/or by using different Walsh/DFT orthogonal codes (time dispersion). The result of multiplying by w0, w1, w2, w3 after the IFFT is identical to the result of multiplying w0, w1, w2, w3 prior to the IFFT. In the LTE system, the PUCCH resource for transmitting the ACK/NACK is expressed as a combination of the frequency-time resource (e.g., resource block) position, the cyclic shift of a sequence for frequency dispersion, and the orthogonal dispersion code for time dispersion. Herein, each PUCCH resource is designated by using a PUCCH (resource) index.

Figure 7:
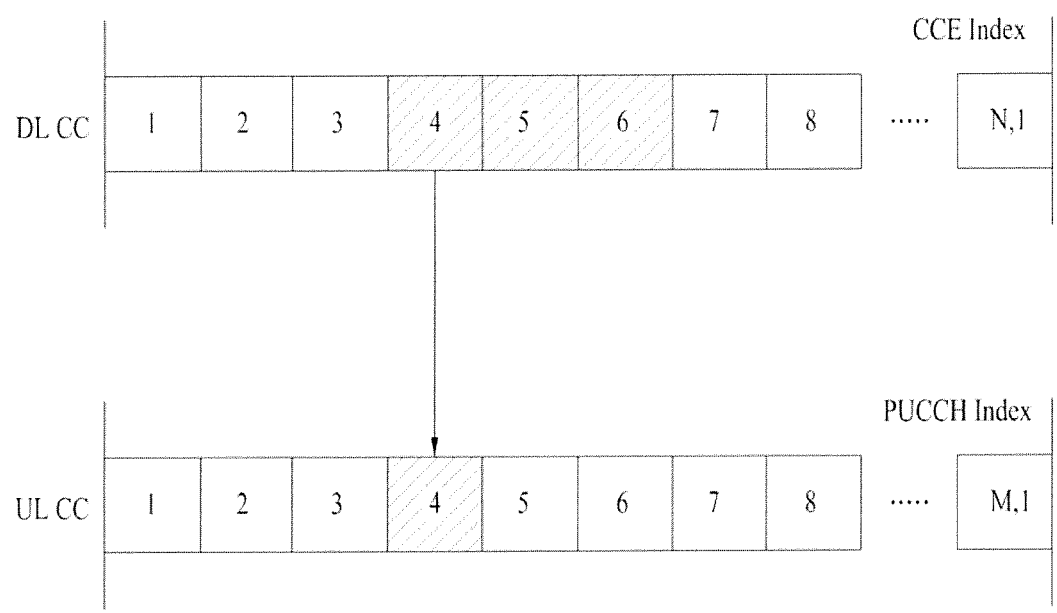
FIG. 7 illustrates an example of deciding a PUCCH resource for transmitting an ACK/NACK signal.

FIG. 7 illustrates an example of deciding a PUCCH resource for transmitting an ACK/NACK signal. In the LTE system, a PUCCH resource for the ACK/NACK is not assigned to each user equipment in advance, and, instead, the multiple user equipments share the multiple PUCCH resources at each time point. More specifically, the PUCCH resource used by the user equipment to transmit the ACK/NACK corresponds to a PDCCH, which carries and delivers scheduling information on the respective downlink data. The entire region, wherein the PDCCH is transmitted from each downlink subframe, is configured of multiple CCEs (Control Channel Elements). And, the PDCCH being transmitted to the user equipment is configured of one or more CCEs. Among the PDCCH received by the user equipment, the user equipment transmits an ACK/NACK through a PUCCH resource corresponding to a specific CCE (e.g., first CCE).

Referring to FIG. 7, in a DownLink Component Carrier each square indicates a CCE, and in an UpLink Component Carrier (UL CC) each square represents a PUCCH resource. Each PUCCH index corresponds to a PUCCH resource for the ACK/NACK. As shown in FIG. 7, when it is assumed that information on a PDSCH is being delivered through a PDCCH configured of CCE number 4~6, the user equipment transmits the ACK/NACK through PUCCH number 4, which corresponds to CCE number 4, the CCE number 4 being the first CCE configuring the PDCCH. FIG. 6 is an exemplary case where a maximum of M number of PUCCHs exists in a UL CC, when a maximum of N number of CCEs exist in the DownLink Component Carrier. Although N may be equal to M (N=M), the M value and the N value may be differently set-up, and the mapping of the CCEs and the PUCCHs may be set to overlap one another.

More specifically, in the LTE system, a PUCCH resource index is decided as shown below.

$$n^{(1)}_{PUCCH} = n_{CCE} + N^{(1)}_{PUCCH} \quad \text{[Equation 1]}$$

Herein, $n^{(1)}_{PUCCH}$ represents a PUCCH resource index for transmitting the ACK/NACK, $N^{(1)}_{PUCCH}$ indicates a signaling value received from an upper layer, and $n_{CCE}$ represents a smallest value among a CCE index used in a PDCCH transmission.

Figure 8:
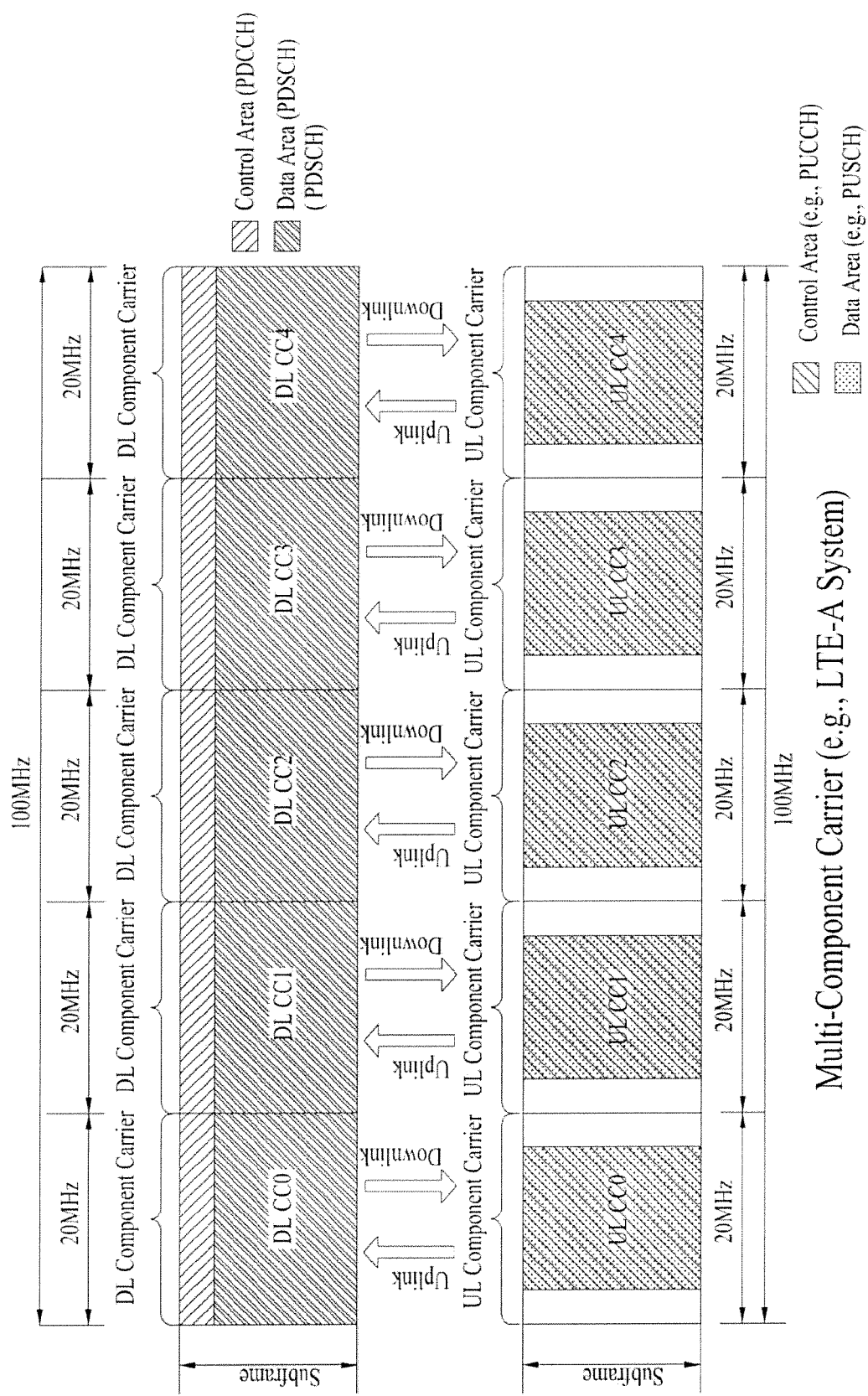
FIG. 8 illustrates an example of performing communication under a multiple component carrier condition.

FIG. 8 illustrates an example of performing communication under a multiple component carrier condition. FIG. 8 may correspond to a communication example of an LTE-A system. In order to use a wider frequency bandwidth, the LTE-A system adopts a carrier aggregation (or bandwidth aggregation) technology gathering a plurality of up-/downlink frequency blocks, so as to use a larger (or wider) up-/downlink bandwidth. Each frequency block is transmitted by using a Component Carrier (CC).

Referring to FIG. 8, 5 (five) 20 MHz CCs may be gathered in each of the up-/downlink, so as to support a 100 MHz bandwidth. The Component Carriers may be adjacent or non-adjacent to one another in the frequency domain. The radio frame structure shown in FIG. 3 may be identically applied to a case where multiple component carriers are being used. However, since the radio frame, the subframe, and the slot correspond to time units, the base station and the user equipment may, for example, transmit and receive a signal through the plurality of component carriers within a single subframe. FIG. 8 shows an example where the bandwidth of the uplink component carrier and the bandwidth of the downlink component carrier are identical to one another and are symmetrical to one another. However, the bandwidth of each component carrier may be decided independently. For example, the bandwidth of the uplink component carrier may be configured as 5 MHz (UL CC0)+20 MHz(UL CC1)+20 MHz(UL CC2)+20 MHz(UL CC3)+5 MHz(UL CC4). Also, an asymmetrical carrier aggregation (or bandwidth aggregation), wherein the number of UL CCs and the number of downlink component carriers are different from one another, may be used. The asymmetrical carrier aggregation (or bandwidth aggregation) may be generated due to a limitation in the available frequency band, or may be artificially configured by network settings. Also, although it is shown, as an example, that the uplink signal and the downlink signal are transmitted through a component carrier mapped at a one-to-one (1:1) correspondence with the signal, the component carrier through which a signal is actually being transmitted may vary depending upon the network settings or the signal type. For example, a component carrier transmitting a scheduling command and a component carrier transmitting data in accordance with a scheduling command may be different from one another. Furthermore, up-/downlink control information may be transmitted through specific uplink/downlink component carrier, regardless of the mapping state between the component carriers.

Although the present invention is not limited to this, when the number of uplink component carriers is smaller than the number of downlink component carriers, the ACK/NACK for the transmission of a plurality of downlink PDSCHs should be transmitted through a smaller number of uplink PUCCHs. Particularly, settings may be made so that the ACK/NACK for the transmission of a plurality of downlink PDSCHs is transmitted only through a specific uplink component carrier. Also, even when the number of uplink component carriers is the same as the number of downlink component carriers, when a MIMO (Multiple Input Multiple Output) transmission method is used, or when operated via TDD, the user equipment received a plurality of transmission blocks. In this case, the user equipment should transmit the ACK/NACK signal for multiple transmission blocks through limited PUCCH resources.

Hereinafter, a method for transmitting an uplink control signal, i.e., ACK/NACK signal from a user equipment proposed in the present invention will now be described in detail. Most particularly, in the method for transmitting an ACK/NACK signal, it is assumed that multiple PUCCH resources for transmitting the ACK/NACK signal are located in the same physical resource block. However, the present invention will not be limited only to this example. And, therefore, even if the PUCCH resources exist within a consistent frequency range, PUCCH resources located in other physical resource blocks may also be applied, provided that such PUCCH resources have channel states.

Figure 9:
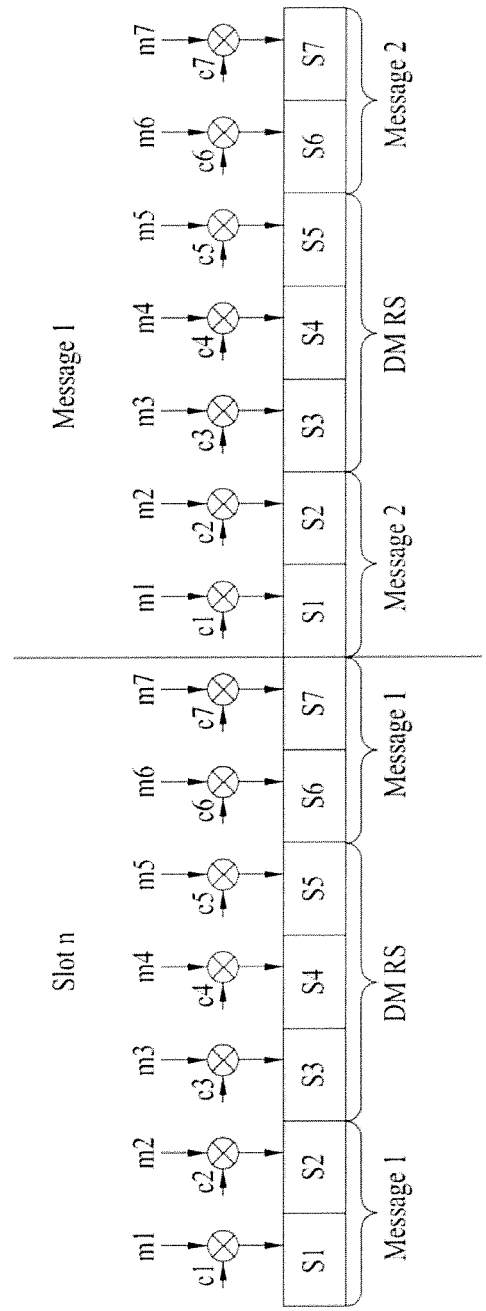
FIG. 9 illustrates a PUCCH structure using a normal CP in an LTE system.

FIG. 9 illustrates a PUCCH structure using a normal CP in an LTE system.

Referring to FIG. 9, the ACK/NACK signal is processed with a modulation process, and the modulated ACK/NACK signal is mounted on a message area of the OFDM symbols, i.e., S1, S2, S6, and S7. Thereafter, an orthogonal cover sequence having a length of 4 is applied to the processed ACK/NACK signal, thereby being distributed to the time domain. And, an orthogonal cover sequence having a length of 3 is applied to OFDM symbols S3 to S5, each having a reference signal for channel measurement mounted thereon, thereby being distributed to the time domain. Based upon the channel measurement result using OFDM symbols S3 to S5, the base station may detect an ACK/NACK signal from the corresponding PUCCH resources.

Meanwhile, in case multiple PUCCH resources are located in the same physical resource block, it may be predicted that the results of channel measurement, which is performed by using the reference signal included in each of the multiple PUCCH resources, are identical to one another. Therefore, based upon the result of a channel measurement, which is performed by using a reference signal received through any one of the PUCCH resources, the ACK/NACK signals received through other PUCCH resources may be detected.

Based upon such characteristics, a method for ensuring (or reserving) an OFDM symbol space, which may transmit an uplink control signal, i.e., an ACK/NACK signal, in addition to the message area of the PUCCH in an LTE-A system is proposed herein. In a first embodiment and a second embodiment, which are described below, it will be assumed that multiple PUCCH resources exist in the same physical resource block. And, such resource allocation may be explicitly or implicitly controlled by the base station or a scheduler.

<First Embodiment>

When performing transmission using multiple PUCCH resources for the feedback of an ACK/NACK signal, channel measurement using multiple reference signals may have a negative effect (or influence) on a signal-to-noise ratio of the base station, due to the limited transmission power of the user equipment. Therefore, only a portion (or some) of the reference signals, among a total of N number of reference signals, may be transmitted in order to effectively perform channel measurement. In this case, the reference signals that are transmitted may increase the transmission power by also allocating the power that is to be used to the non-transmitted reference signals. Thus, the signal-to-noise ratio of the base station may be enhanced.

As described above, when transmitting ACK/NACK signals corresponding to the multiple PDSCHs by using the total of N number of PUCCH resources, the message area of each of the N number of PUCCH resources may be transmitted. However, if the transmission is performed by using a method of selecting only a portion of the reference signal areas among the reference signal areas of the N number of PUCCH resources, a data symbol space that can transmit the uplink control signal and, most particularly, the ACK/NACK signal, may be ensured. For example, when one of the reference signals, among the total of N number of PUCCH resources, is transmitted, N number of possible selections for selecting the reference signal area may exist.

The base station determines which reference signal has been received, and, then, the base station may interpret the determined information as the uplink control information. More specifically, the selection of a reference signal, among N number of selection options, may be interpreted as control information having a size of $\log_2 N$ bits or smaller, wherein the number of bits smaller than $\log_2 N$ is an integer.

TABLE 2

| index of DM-RS | information |
| --- | --- |
| 1 | 000 |
| 2 | 001 |
| 3 | 010 |
| 4 | 011 |
| 5 | 100 |
| 6 | 101 |
| 7 | 110 |
| 8 | 111 |

Table 2 shows examples of reference signal area selection information and bit information corresponding to the reference signal area selection information, when 1 reference signal is selected from 8 PUCCH resources and then transmitted. In case the user equipment has transmitted a reference signal of PUCCH resource #1, the base station may interpret the transmitted reference signal as bit information of 000. And, in case the user equipment has transmitted a reference signal of PUCCH resource #6, the base station may interpret the transmitted reference signal as bit information of 101. In case the user equipment has selected two reference signals from N number of PUCCH resources and has transmitted the two selected reference signals, $_NC_2=N*(N-1)/2$ number of possible selections for selecting the reference signals may exist. And, the base station may interpret the selected reference signals as control information having a bit size of $\log_2 N*(N-1)/2$ or smaller, wherein the bit size of the control information is an integer.

Evidently, although the user equipment may select a maximum of N number of reference signals, the maximum number of bits that may be interpreted by the base station corresponds to when the user equipment has selected N/2 number of reference signals. In this case, $_NC_{N/2}$ number of possible selections for selecting the reference signals may exist. And, the base station may interpret the selected reference signals as control information having a bit size of $\log_2\{_NC_{N/2}\}$ or smaller, wherein the bit size of the control information is an integer.

Figure 10:
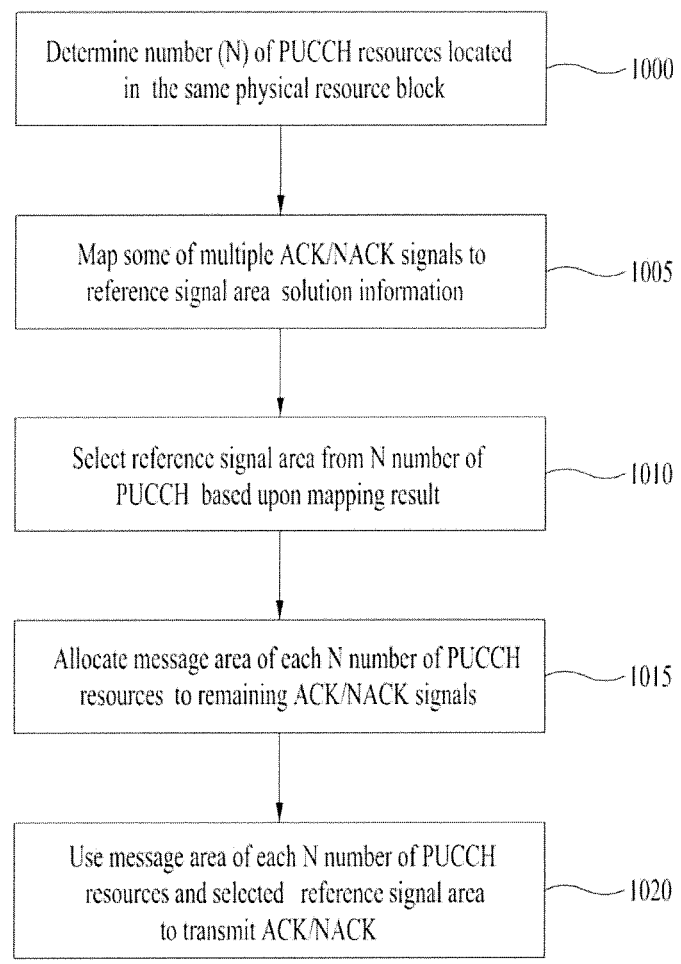
FIG. 10 illustrates a flow chart showing a method for transmitting ACK/NACK signals according to a first exemplary embodiment of the present invention.

FIG. 10 illustrates a flow chart showing a method for transmitting ACK/NACK signals according to a first exemplary embodiment of the present invention.

Referring to FIG. 10, in step 1000, the user equipment determined a number (N) of PUCCH resources located in the same physical resource block. Herein, N may be explicitly or implicitly signaled by the base station or a scheduler.

Also, in step 1005, the user equipment maps a portion of the ACK/NACK signals to the reference signal area selection information. And, then, the user equipment selects K number of reference signal areas from the N number of PUCCH resources, with respect to the mapped portion of the ACK/NACK signals. More specifically, among the ACK/NACK signals, when an ACK/NACK signal having the bit size of $X=\log_2\{_NC_K\}$ is to be transmitted by using an additional resource, based upon the table information predetermined with the base station, among the multiple ACK/NACK signals, a signal having the size of X bits is mapped to the selection information of K number of reference signal areas, which are to be expressed. In step 1010, based upon the mapped result, the user equipment selects a reference signal area among the N number of PUCCH resources.

Subsequently, in step 1015, the user equipment allocates the message area of each N number of PUCCH resources to the remaining ACK/NACK signals. And, in step 1020, the user equipment uses the message area of each N number of PUCCH resources and the selected reference signal areas, so as to transmit the ACK/NACK signals to the base station.

Accordingly, the base station may receive the transmitted ACK/NACK signals by using the modulated symbols included in each message area of the N number of PUCCH resources and also by using information indicating which reference signal areas have been selected from the total of N number of reference signal areas.

<Second Embodiment>

As described above, the first embodiment of the present invention corresponds to a case when multiple PUCCH resources located in the same physical resource block are transmitted as ACK/NACK response. The second embodiment of the present invention corresponds to a case when ACK/NACK response for multiple PDSCHs, which are received from the base station, is transmitted by using one PUCCH resource among multiple PUCCH resources located in the same physical resource block.

For example, when 5 (five) PUCCH resources exist in the same physical resource block, and when one PUCCH resource is selected from the 5 PUCCH resources, the transmitted information may correspond to information carried in a message are of the selected PUCCH resource and information on a PUCCH resource selection. More specifically, since QPSK is used as the modulation scheme in the message area of the PUCCH resource, a 2-bit information may be transmitted. And, control information having the size of $\log_2 5$ bits, which indicates that one PUCCH resource has been selected from the 5 PUCCH resources, may also be transmitted along with the 2-bit information, However, as described above, in case 5 (five) PUCCH resources exist in the same physical resource block, a message area of the PUCCH resource and a reference signal area may be independently selected. More specifically, when N number of PUCCH resources exist in the same physical resource block, N number of possible message area selections may exist, and N number of possible reference signal area selections may exist. Therefore, in addition to the modulation symbol, which is carried in the message area of the selected PUCCH resource, control information having the size of $\log_2 (N*N)$ bits may be additionally transmitted.

Table 3 below shows exemplary combinations of message areas and reference signal areas, when 2 to 5 PUCCH resources exist in the same physical resource area, and when each PUCCH resource may be transmitted from each antenna.

TABLE 3

| N (number of PUCCH per antenna) | Possible Combinations Mi: Message part of PUCCH i, Ri: DM-RS part PUCCH i. |
|---|---|
| 2 | (M1, R1), (M1, R2), (M2, R1), (M2, R2) |
| 3 | (M1, R1), (M1, R2), (M1, R3), (M2, R1), (M2, R2), (M2, R3), (M3, R1), (M3, R2), (M3, R3) |
| 4 | (M1, R1), (M1, R2), (M1, R3), (M1, R4), (M2, R1), (M2, R2), (M2, R3), (M2, R4), (M3, R1), (M3, R2), (M3, R3), (M3, R4), (M4, R1), (M4, R2), (M4, R3), (M4, R4) |
| 5 | (M1, R1), (M1, R2), (M1, R3), (M1, R4), (M1, R5), (M2, R1), (M2, R2), (M2, R3), (M2, R4), (M2, R5), (M3, R1), (M3, R2), (M3, R3), (M3, R4), (M3, R5), (M4, R1), (M4, R2), (M4, R3), (M4, R4), (M4, R5), (M5, R1), (M5, R2), (M5, R3), (M5, R4), (M5, R5) |

Referring to Table 3, when 2 PUCCH resources exist for each antenna, 4 different combinations may exist, the 4 different combinations being (M1,R1), (M1,R2), (M2,R1), and (M2, R2). Therefore, it will be apparent that control information having the size of 2 bits, which is the equivalent of $\log_2 4$, may be additionally transmitted, in addition to the message area (i.e., M1 or M2) of the selected PUCCH resource. Furthermore, when 4 PUCCH resources exist for each antenna, 16 different combinations may exist. And, therefore, it will be apparent that control information having the size of 4 bits, which is the equivalent of $\log_2 16$, may be additionally transmitted, in addition to the message area (i.e., M1 or M2) of the selected PUCCH resource.

Although the above description provides an example wherein the number of antennae is limited to only one antenna, when the user equipment uses multiple antennae in order to perform uplink transmission, each antenna may use $N_k$ number of PUCCH resources existing in the same physical resource block so as to perform uplink transmission. Herein, k indicates an antenna index. In case the messages being transmitted from each antenna are independent from one another, control information having the size of $\log_2(N_k * N_k)$ bits may be additionally transmitted for each antenna.

Meanwhile, in case the messages being transmitted from each antenna are inter-related, so as to configure a single message, the combination of the resources respective to each antenna may be interpreted as another message. For example, when K number of transmission antennae share A number of PUCCH resources, among the A number of PUCCH resources, K number of message areas, each being different from one another, are selected, and, in this case also, $X = {}_A C_K$ number of selection combinations may exist. Therefore, in addition to the modulation symbol, which is carried in the message area of the PUCCH resource selected from each antenna, control information having the size of $\log_2(X*X)$ bits may be additionally transmitted.

Figure 11:
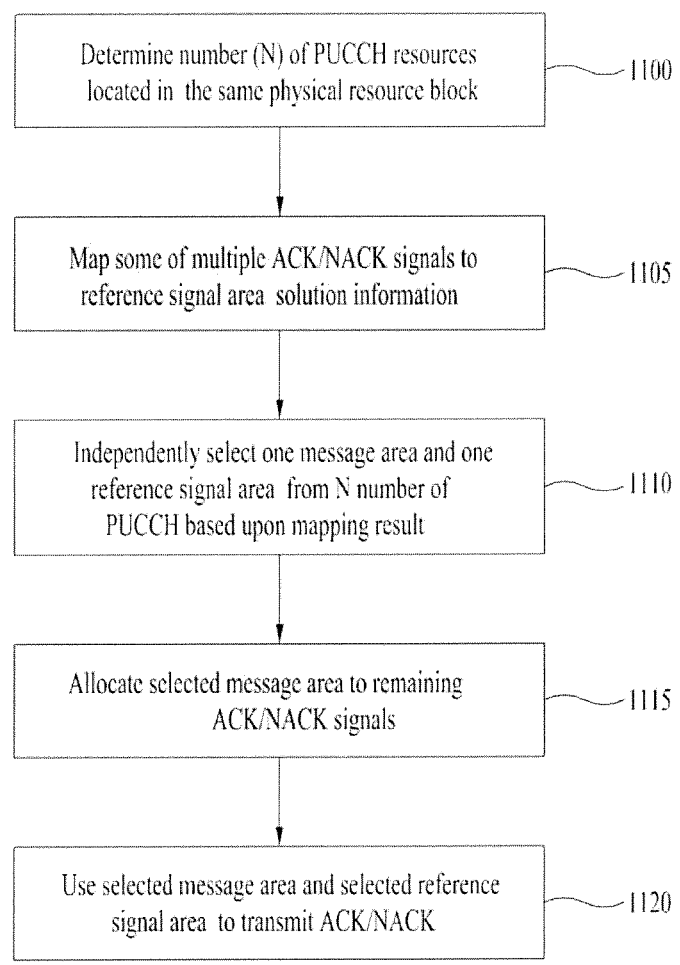
FIG. 11 illustrates a flow chart showing a method for transmitting ACK/NACK signals according to a second exemplary embodiment of the present invention.

FIG. 11 illustrates a flow chart showing a method for transmitting ACK/NACK signals according to a second exemplary embodiment of the present invention.

Referring to FIG. 11, in step 1100, the user equipment determined a number (N) of PUCCH resources located in the same physical resource block. Herein, N may be explicitly or implicitly signaled by the base station or a scheduler.

Also, in step 1105, among the ACK/NACK signals, when an ACK/NACK signal having the bit size of $X = \log_2(N*N)$ is to be transmitted by using an additional resource, based upon the table information predetermined with the base station, among the multiple ACK/NACK signals, the signal is mapped to selection information, which is configured of 1 message area and 1 reference signal area, among the N number of PUCCH resources. In step 1110, based upon the mapped result, the user equipment individually selects 1 message area and 1 reference signal area, among the N number of PUCCH resources. Herein, the selected message area and the selected reference signal area are not required to be included in the same PUCCH resource. And, it shall be noted that the selected message area and the selected reference signal area are independent from one another.

Subsequently, in step 1115, the user equipment allocates the selected message area to the remaining ACK/NACK signals. And, in step 1120, the user equipment uses the selected message area and the selected reference signal area, so as to transmit the ACK/NACK signals to the base station.

Accordingly, the base station may receive the transmitted ACK/NACK signals by using the modulated symbols included in the selected message area and by using the selection information.

As described above, it is preferable to transmit initially intended information to the message area of the PUCCH resource (i.e., ACK/NACK signals). And, for the additional symbol space (i.e., the selection information, etc.), the initially intended information may be extended and transmitted, and other information may be additionally added and transmitted.

For example, in case the additional information is mapped to the selection information, so as to be transmitted, it may be considered in the present invention to transmit the control information, which may be the target receiving the additional information mapped to the selection information, by including a portion or the whole information, such as CQI, RP, PMI, in the control information by using information that may intermittently occur, such as a scheduling request (SR), or by using information on channel estimation. Additionally, it may also be considered in the present invention to map additional information related to the ACK/NACK signals, such as the number of ACK/NACK signals, the additional information being included in the multiple ACK/NACK signals, to the selection information. In case of transmitting the number of ACK/NACK signals included in the multiple ACK/NACK signals, it is preferable to predetermine a consistent order for the reference signal area selection. Then, based upon the predetermined reference signal area selection order, it is preferable to select a reference signal area in accordance with the number of reference signal areas, among the PUCCH resources that are actually being used, and in accordance with the number of ACK/NACK signals each transmitting an index.

Figure 12:
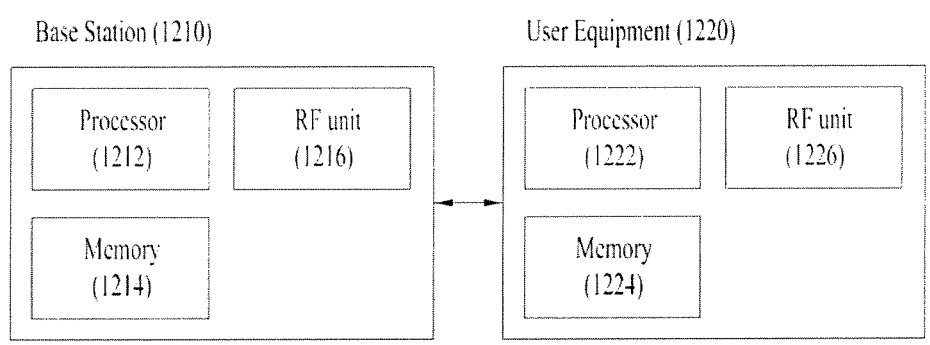
FIG. 12 illustrates an exemplary base station and an exemplary user terminal that can be applied to the embodiment of the present invention.

FIG. 12 illustrates an exemplary base station and an exemplary user terminal that can be applied to the embodiment of the present invention.

Referring to FIG. 12, a wireless communication system includes a base station (BS, 1210) and a user equipment (UE, 1220). In a downlink, the transmitter corresponds to a portion of the base station (1210), and the receiver corresponds to a portion of the user equipment (1220). In an uplink, the transmitter corresponds to a portion of the user equipment (1220), and the receiver corresponds to a portion of the base station (1210). The base station (1210) and/or the user equipment (1220) may be equipped with a single antenna or may be equipped with multiple antennae.

The user equipment (1220) includes a processor (1222), a memory (1224), and an RF unit (1226). The processor (1222) may be configured to realize procedures and/or methods proposed in the present invention. The memory (1224) is connected to the processor (1222) and stores diverse information related to the operation of the processor (1222). The RF unit (1226) is connected to the processor (1222) and transmits and/or receives radio signals. More specifically, the RF unit (1226) includes a transmitting module and a receiving module.

The base station (1210) includes a processor (1212), a memory (1214), and a Radio Frequency (RF) unit (1216). The processor (1212) may be configured to realize procedures and/or methods proposed in the present invention. The memory (1214) is connected to the processor (1212) and stores diverse information related to the operation of the processor (1212). The RF unit (1216) is connected to the processor (1212) and transmits and/or receives radio signals. More specifically, the RF unit (1216) includes a transmitting module and a receiving module.

Most particularly, in case of transmitting multiple PUCCH resources located in the same physical resource block as ACK/NACK response, the processor (1222) of the user equipment (1220) determines the number (N) of PUCCH resources located in the same physical resource block. And, then, the processor (1222) of the user equipment (1220) maps a portion (or some) of the ACK/NACK signals to reference signal area selection information. Additionally, based upon the mapped reference signal area selection information, the processor (1222) of the user equipment (1220) selects K number of reference signal areas from the N number of PUCCH resources. More specifically, among the ACK/NACK signals, when a signal having the size of $X=\log_2\{_NC_K\}$ bits is to be transmitted by using an additional resource, based upon the table information predetermined with the base station, among the multiple ACK/NACK signals, a signal having the size of X bits is mapped to the selection information of K number of reference signal areas, which are to be expressed. Furthermore, based upon the mapped result, the processor (1222) of the user equipment (1220) selects a reference signal area among the N number of PUCCH resources and allocates the message area of each N number of PUCCH resources to the remaining ACK/NACK signals. Herein, it is preferable that N is explicitly or implicitly signals by the base station or scheduler. In this case, the processor (1222) of the user equipment (1220) uses information on the modulation symbols included in the message area of each N number of PUCCH resources and information on which K number of reference signal areas have been selected, so as to detect the ACK/NACK signals.

Alternatively, in case of transmitting ACK/NACK response for multiple PDSCHs, which are received from the base station, by using one PUCCH resource among multiple PUCCH resources located in the same physical resource block, among the ACK/NACK signals, when the processor (1222) of the user equipment (1220) seeks to transmit an ACK/NACK signal having the bit size of $X=\log_2(N*N)$ by using an additional resource, based upon the table information predetermined with the base station, among the multiple ACK/NACK signals, the processor (1222) of the user equipment (1220) maps the signal to selection information, which is configured of 1 message area and 1 reference signal area, among the N number of PUCCH resources. Then, based upon the mapped result, the processor (1222) of the user equipment (1220) individually selects 1 message area and 1 reference signal area, among the N number of PUCCH resources. In this case, the processor (1222) of the user equipment (1220) allocates the selected message area to the remaining ACK/NACK signals. And, in this case, the processor (1212) of the user equipment (1210) may receive the transmitted ACK/NACK signals by using the modulated symbols included in the selected message area and by using the selection information.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), access point, and so on. Also, the terminal may be replaced with terms such as UE (User Equipment), MS (Mobile Station), MSS (Mobile Subscriber Station), and so on.

The embodiments according to the present invention can be implemented by various means, for example, hardware, firmware, software, or their combination. If the embodiment according to the present invention is implemented by hardware, the embodiment of the present invention can be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

The present invention may be applied in a wireless communication system. More specifically, the present invention may be applied to a method and apparatus for transmitting ACK/NACK information in a wireless communication system applying carrier aggregation (or bandwidth aggregation).

What is claimed is:

1. A method of a user equipment for transmitting an ACK/NACK (Acknowledgement/Negative-ACK) signal in a wireless communication system, the method comprising:
mapping, by the user equipment, some of multiple ACK/NACK signals to reference signal area selection information;
based upon the mapped reference signal area selection information, selecting, by the user equipment, one or more reference signal areas among multiple control channel resources, the multiple control channel resources being located in a same physical resource block;
allocating, by the user equipment, a message area of each of the multiple control channel resources to remaining ACK/NACK signals; and
transmitting, by the user equipment, ACK/NACK signals to a base station by using the one or more selected reference signal areas and the allocated message area of each of the multiple control channel resources,
wherein,
when a number of reference signal areas included in the multiple control channel resources is equal to N, and
when a number of the selected reference signal areas is equal to K,
a size of the some of the ACK/NACK signals corresponds to a number of bits smaller than $\log_2\{_NC_K\}$ bits or equal to $\log_2\{_NC_K\}$ bits, wherein the number of bits is an integer.

2. The method of claim 1, wherein the reference signal area selection information corresponds to information related to a combination of one or more reference signal areas, among reference signal areas included in the multiple control channel resources.

3. A method for allocating resources enabling a user equipment to transmit an ACK/NACK (Acknowledgement/Negative-ACK) signal in a wireless communication system, the method comprising:
mapping, by the user equipment, some of multiple ACK/NACK signals to selection information, the selection information being configured of a combination of a message area and a reference signal area;
based upon the mapped selection information, independently selecting, by the user equipment, one message area and one reference signal area among multiple control channel resources, the multiple control channel resources being located in a same physical resource block;
allocating, by the user equipment, the selected message area to remaining ACK/NACK signals; and
transmitting, by the user equipment, ACK/NACK signals to a base station by using the selected message area and the selected reference signal area,
wherein, when a number of the multiple control channel resources is equal to N, a size of the some of the ACK/NACK signals corresponds to a number of bits smaller than log2(N*N) bits or equal to log2{N*N} bits, wherein the number of bits is an integer.

4. The method of claim 3, further comprising:
receiving information on multiple control channel resources from the base station, the multiple control channel resources being located in a same physical resource block.

5. The method of claim 3, wherein each of the selected message area and the selected reference signal area is included in a different control channel resource.

6. A user equipment, comprising:
a processor configured to map some of multiple ACK/NACK signals to reference signal area selection information, to select one or more reference signal areas among multiple control channel resources, based upon the mapped reference signal area selection information, the multiple control channel resources being located in a same physical resource block, and to allocate a message area of each of the multiple control channel resources to remaining ACK/NACK signals; and
a transmitter configured to transmit ACK/NACK signals to a base station by using the one or more selected reference signal areas and the allocated message area of each of the multiple control channel resources,
wherein,
when a number of reference signal areas included in the multiple control channel resources is equal to N, and
when a number of the selected reference signal areas is equal to K,
a size of the some of the ACK/NACK signals corresponds to a number of bits smaller than $\log_2\{_NC_K\}$ bits or equal to $\log_2\{_NC_K\}$ bits, wherein the number of bits is an integer.

7. The user equipment of claim 6, wherein the reference signal area selection information corresponds to information related to a combination of one or more reference signal areas, among reference signal areas included in the multiple control channel resources.

8. A user equipment, comprising:
a processor configured to map some of multiple ACK/NACK signals to selection information, the selection information being configured of a combination of a message area and a reference signal area, to independently select one message area and one reference signal area among multiple control channel resources, based upon the mapped selection information, the multiple control channel resources being located in a same physical resource block, and to allocate the selected message area to remaining ACK/NACK signals; and
a transmitter configured to transmit ACK/NACK signals to a base station by using the selected message area and the selected reference signal area,
wherein, when a number of the multiple control channel resources is equal to N, a size of the some of the ACK/NACK signals corresponds to a number of bits smaller than log2(N*N) bits or equal to log2{N*N} bits, wherein the number of bits is an integer.

9. The user equipment of claim 8, wherein information on multiple control channel resources is signaled from the base station, the multiple control channel resources being located in a same physical resource block.

10. The user equipment of claim 8, wherein each of the selected message area and the selected reference signal area is included in a different control channel resource.

* * * * *